United States Patent
Scheibe

(10) Patent No.: US 7,648,119 B2
(45) Date of Patent: Jan. 19, 2010

(54) MAGNETIC DRIVE FOR A VALVE

(75) Inventor: Ralf Scheibe, Kuenzelsau-Garnberg (DE)

(73) Assignee: Burkert Werke GmbH & Co. KG, Ingelfingen (DE)

( * ) Notice: Subject to any disclaimer, the term of this patent is extended or adjusted under 35 U.S.C. 154(b) by 239 days.

(21) Appl. No.: 11/105,154

(22) Filed: Apr. 13, 2005

(65) Prior Publication Data

US 2005/0230649 A1 Oct. 20, 2005

(30) Foreign Application Priority Data

Apr. 19, 2004 (DE) .................. 20 2004 006 156 U

(51) Int. Cl.
*F16K 31/02* (2006.01)
(52) U.S. Cl. ................ 251/65; 251/129.16; 251/129.19; 251/129.2
(58) Field of Classification Search ............ 251/129.16, 251/65, 129.15, 129.19, 129.2
See application file for complete search history.

(56) References Cited

U.S. PATENT DOCUMENTS

| 4,161,306 A * | 7/1979 | Brune et al. ............ 251/129.15 |
| 5,947,155 A * | 9/1999 | Miki et al. ............. 137/625.65 |
| 6,517,045 B1* | 2/2003 | Northedge ................... 251/65 |
| 6,581,556 B2* | 6/2003 | Kim ........................ 123/90.11 |
| 2003/0030958 A1* | 2/2003 | Saito et al. ................... 361/170 |
| 2004/0217313 A1* | 11/2004 | Sedda et al. ............. 251/129.1 |

FOREIGN PATENT DOCUMENTS

| JP | 03121388 A * | 5/1991 |
| JP | 09152041 | * 11/1995 |

* cited by examiner

*Primary Examiner*—J. Casimer Jacyna
(74) *Attorney, Agent, or Firm*—Stuart J. Friedman

(57) ABSTRACT

A magnetic drive for a valve, in particular for a pneumatic or hydraulic valve, includes a movable armature (14) and a permanent magnet (20). The permanent magnet (20) is formed from a magnetic paste or a magnetic foil. In preferred embodiments, the permanent magnet (20) is integrated into the movable armature (14) and cooperates with a fixed solenoid.

4 Claims, 4 Drawing Sheets

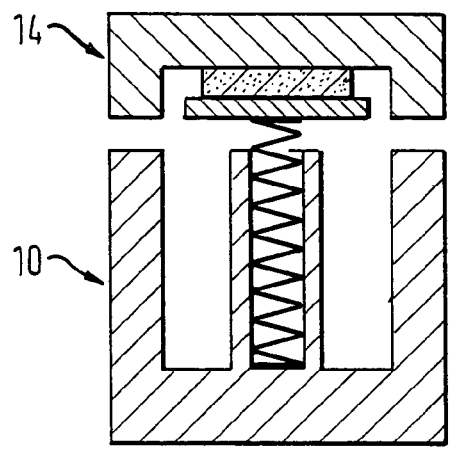
Fig. 5a
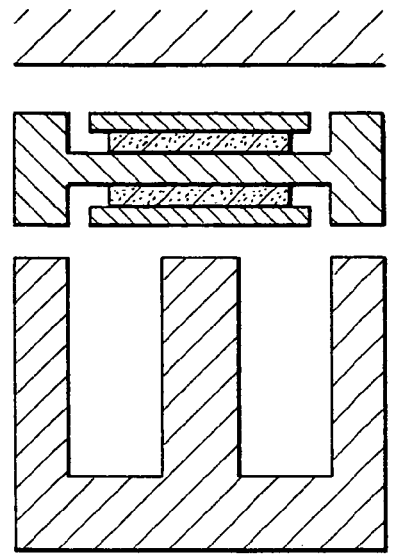
Fig. 5b
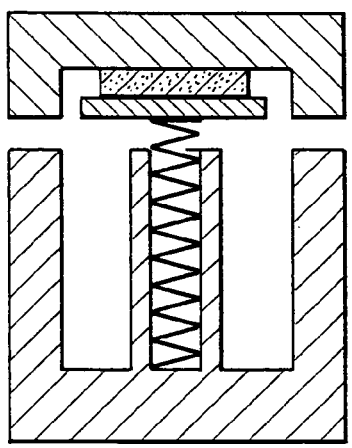
Fig. 5c
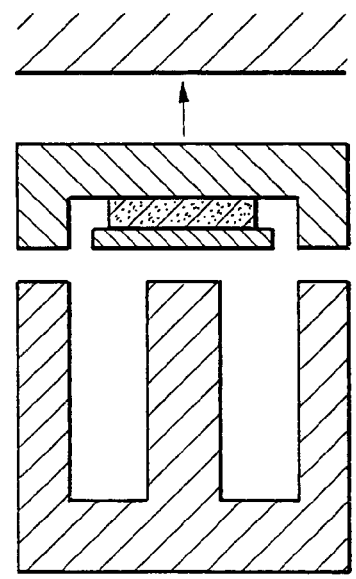
Fig. 5d

MAGNETIC DRIVE FOR A VALVE

BACKGROUND OF THE INVENTION

The invention relates to a magnetic drive for a valve, in particular for a pneumatic or hydraulic valve.

From German patent application DE 102 07 828 A1 a magnetic drive comprising a polarized movable armature is known. The armature includes a permanent magnet in the form of a ring magnet, which is arranged between two rings conducting the magnetic flux. The ring magnet is polarized perpendicularly to the direction of movement of the armature.

In German patent specification DE 197 22 013 C2 a magneto-mechanical power system is shown in which a pole plate resting on an solenoid is raised when the solenoid is energized. Here, the magnetic flux is partially displaced into a shunt air gap which is formed between a neck of a flux conductor plate and the wall of a soft-iron pot of the solenoid.

It is an object of the invention to provide a compact magnetic drive for a valve showing a minimized switching or continuous duty.

BRIEF SUMMARY OF THE INVENTION

The magnetic drive according to the invention comprises a movable armature and a permanent magnet. The permanent magnet is formed from a magnetic paste or from a magnetic foil. The invention is based on the finding that magnetic paste or foil blanks are fabricable, from which specifically shaped permanent magnets are able to be realized. Even complicated shapes are possible, if required. Therefore, the permanent magnet can be "custom-made" for the respective requirements, in particular with regard to its three-dimensional shape.

The permanent magnet formed from the magnetic paste or foil can generally represent a portion of the magnetic drive. In the preferred embodiments of the invention, the magnetic drive comprises a fixed solenoid the permanent magnet being integrated into the movable armature and co-operating with the fixed solenoid.

According to a preferred design, the armature comprises at least a first part and a second part. The armature is movable in an axial direction. The permanent magnet is arranged between the first part and the second part with respect to the axial direction.

The first and second parts are preferably constructed in a plate shape. The second part lies directly opposite the solenoid. The first part has an extension extending in axial direction towards the solenoid.

In addition, in the preferred embodiment, a radial secondary gap is formed between the extension of the first part and the second part with respect to the axial direction.

A magnetically non-conducting material may be arranged in the secondary gap.

With a suitable selection of the material and the geometry of the components of the solenoid and of the armature, also with respect to the surrounding parts (e.g. in view of a translatory or rotary drive movement of the armature), a plurality of valve functions can be realized.

BRIEF DESCRIPTION OF THE DRAWINGS

FIGS. 5a and 5d show diagrammatically illustrated variants of the magnetic drive according to the invention.

DETAILED DESCRIPTION OF PREFERRED EMBODIMENTS

Figure 1:
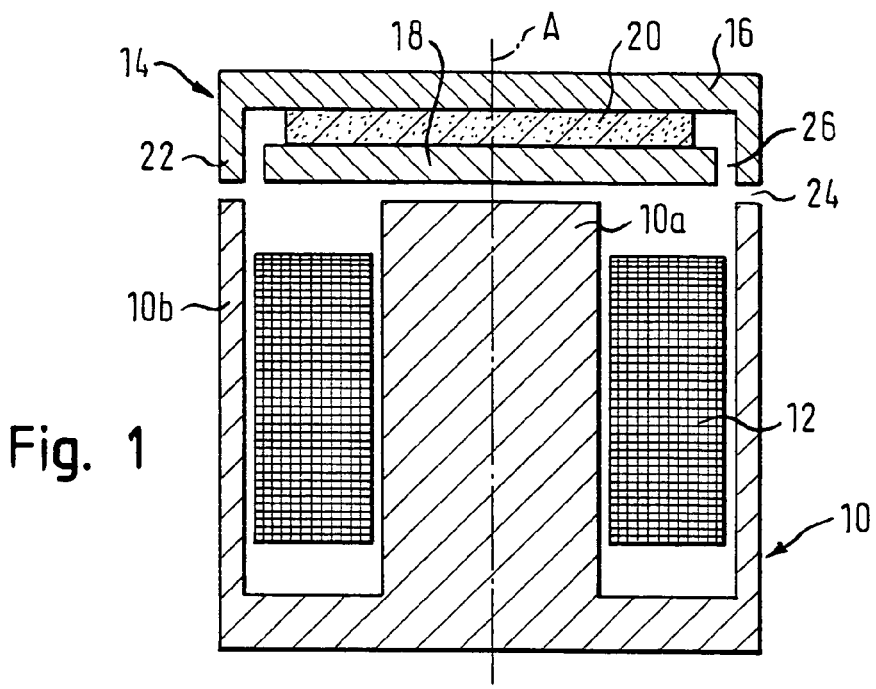
FIG. 1 shows the basic structure of a magnetic drive according to the invention, in sectional view.

The basic structure of a magnetic drive for a valve according to the invention can be seen from FIG. 1. A pot 10 with a coil 12 wound concentrically around a central axis A of the pot 10 forms an solenoid in a known manner. The pot 10 has an E-shaped cross-section with a central part 10a and a wall 10b. An armature 14, movable in the direction of the axis A, is arranged opposite the solenoid. The armature 14 comprises a first part 16 and a second part 18 lying directly opposite the solenoid. The first and second parts 16, 18 both are substantially plate-shaped and extend perpendicularly to the axis A.

A permanent magnet 20 is arranged between the two parts 16 and 18. The first part 16 has on its edge side an extension 22, directed towards the solenoid, which lies opposite the solenoid. The gap between the second component 18, in particular the extension 22, and the solenoid is referred to as working air gap 24. A radial gap which is referred to as secondary gap 26 is provided between the extension 22 and the second part 18. A magnetically non-conducting material, e.g. a plastic ring (not shown), may be arranged in the secondary gap 26. The armature 14 may be coupled to a spring element (not shown in FIG. 1) which exerts onto the armature 14 a pre-stressing force directed away from the solenoid.

The permanent magnet 20 is formed from a magnetic paste on the basis of a NdFeB powder, with which very specific magnet shapes can be realized. Alternatively, the permanent magnet 20 may also be formed from magnetic foils which are specifically cut to size (foil-cast layers) which are likewise produced on the basis of a NdFeB powder. The permanent magnet 20 is polarized in axial direction.

Figure 2:
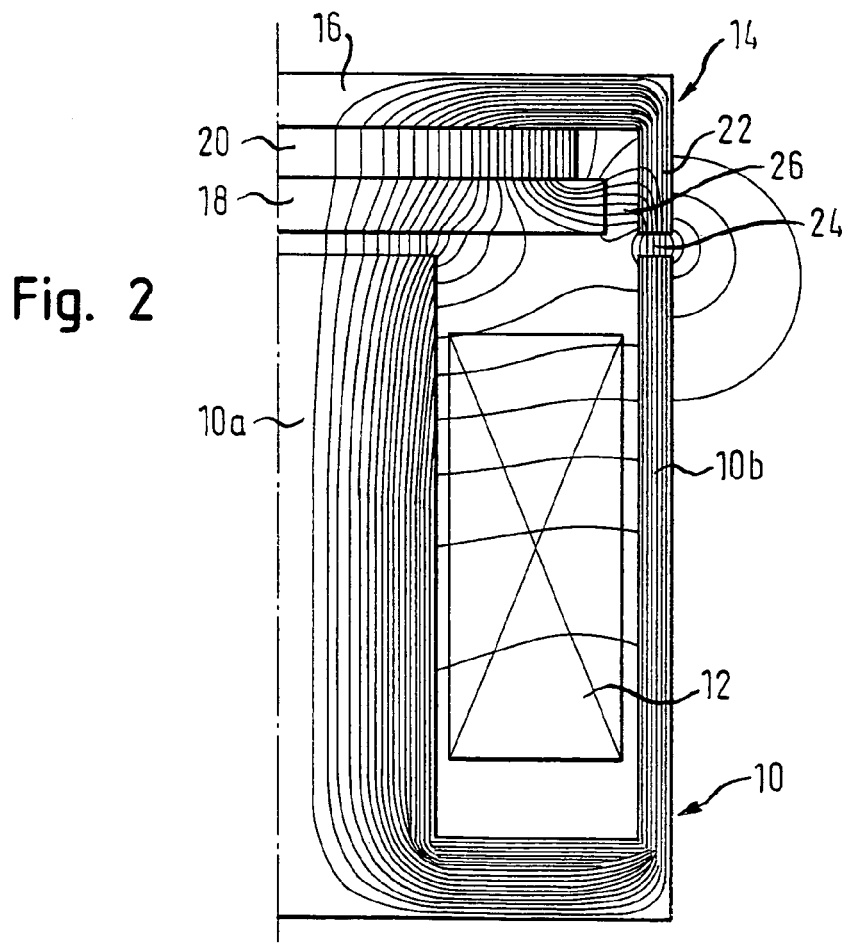
FIG. 2 shows the magnetic flux lines in a magnetic drive according to the invention, with the armature in a non-resting position and the solenoid applied with positive current.

FIG. 2 shows the course of the magnetic flux lines in a magnetic drive according to the invention, with the armature 14 in a non-resting position and the solenoid applied with positive current. In this case the magnetic field of the solenoid induced by the coil 12 is added to the magnetic field of the permanent magnet 20. Therefore, on the one hand, a flux is produced from the central part 10a of the pot 10 via the working air gap 24 through the second part 18 into the permanent magnet 20, and, on the other hand, from the permanent magnet 20 through the second part 18 via the secondary gap 26 into the extension 22 of the first part 16 and again via the working air gap 24 into the wall 10b of the pot 10. The first part 16 provides for a "short circuit" of the lines of flux entering in axial direction into the permanent magnet 20 and emerging from the permanent magnet 20. This path of flux results in an attractive force of the solenoid onto the armature 14. This force is possibly greater than the pre-stressing force of the spring element, so that the armature 14 moves towards the solenoid (stroke), until it rests on the solenoid.

Figure 3:
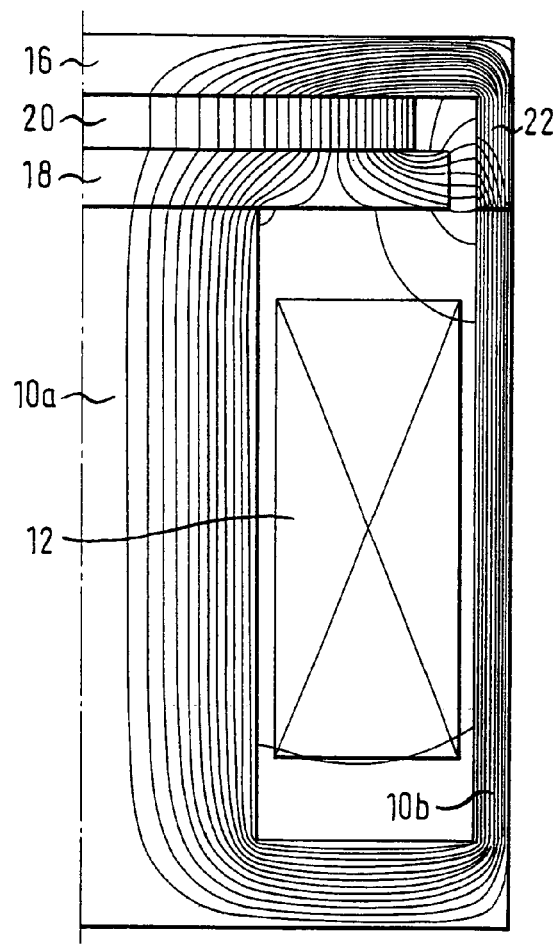
FIG. 3 shows the magnetic flux lines with the armature in a resting position and a currentless solenoid.

This state is illustrated in FIG. 3 with the solenoid being currentless. The working air gap 24 is closed, so that the magnetic flux lines pass directly from the central part 10a of the pot 10 into the second part 18 and from the extension 22 of the first part 16 into the wall 10b of the pot 10.

Figure 4:
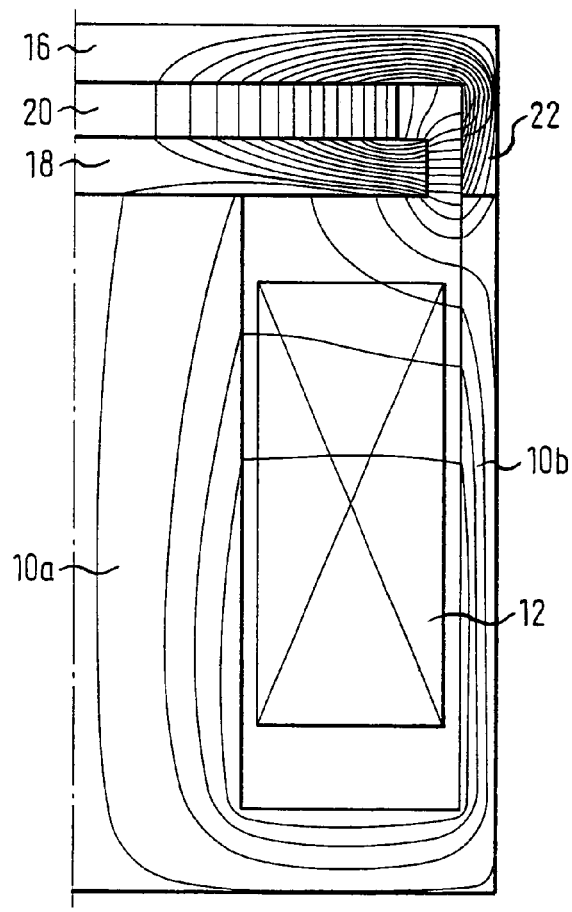
FIG. 4 shows the magnetic flux lines with the armature being in a resting position and the solenoid applied with negative current.

In order to move the armature 14 away from the solenoid again (restoring), the solenoid is applied with negative current, i.e. the magnetic field induced by the coil 12 is directed against the field of the permanent magnet, so that a repelling force is exerted onto the armature 14. The corresponding course of the magnetic flux lines is shown in FIG. 4. The secondary gap 26 again makes the passage of the flux lines possible from the second part 18 to the extension 22 of the first part 16, in this case for the formation of a closed magnetic circuit of the permanent magnet 20.

A material arranged in the secondary gap 26 ensures that the dimensions of the secondary gap 26 remain constant.

In FIGS. 5a to 5d, four different variants of a magnetic drive according to the invention are illustrated diagrammatically, which are characterized with the aid of the following Table:

|  | Spring element | bistable/ monostable | switching current |
| --- | --- | --- | --- |
| Variant 1 (FIG. 5a) | + | b | i+; i− |
| Variant 2 (FIG. 5b) | − | b | i+; i− |
| Variant 3 (FIG. 5c) | + | m | i+; i + H |
| Variant 4 (FIG. 5d) | − | m | i+ |

Figure 6:
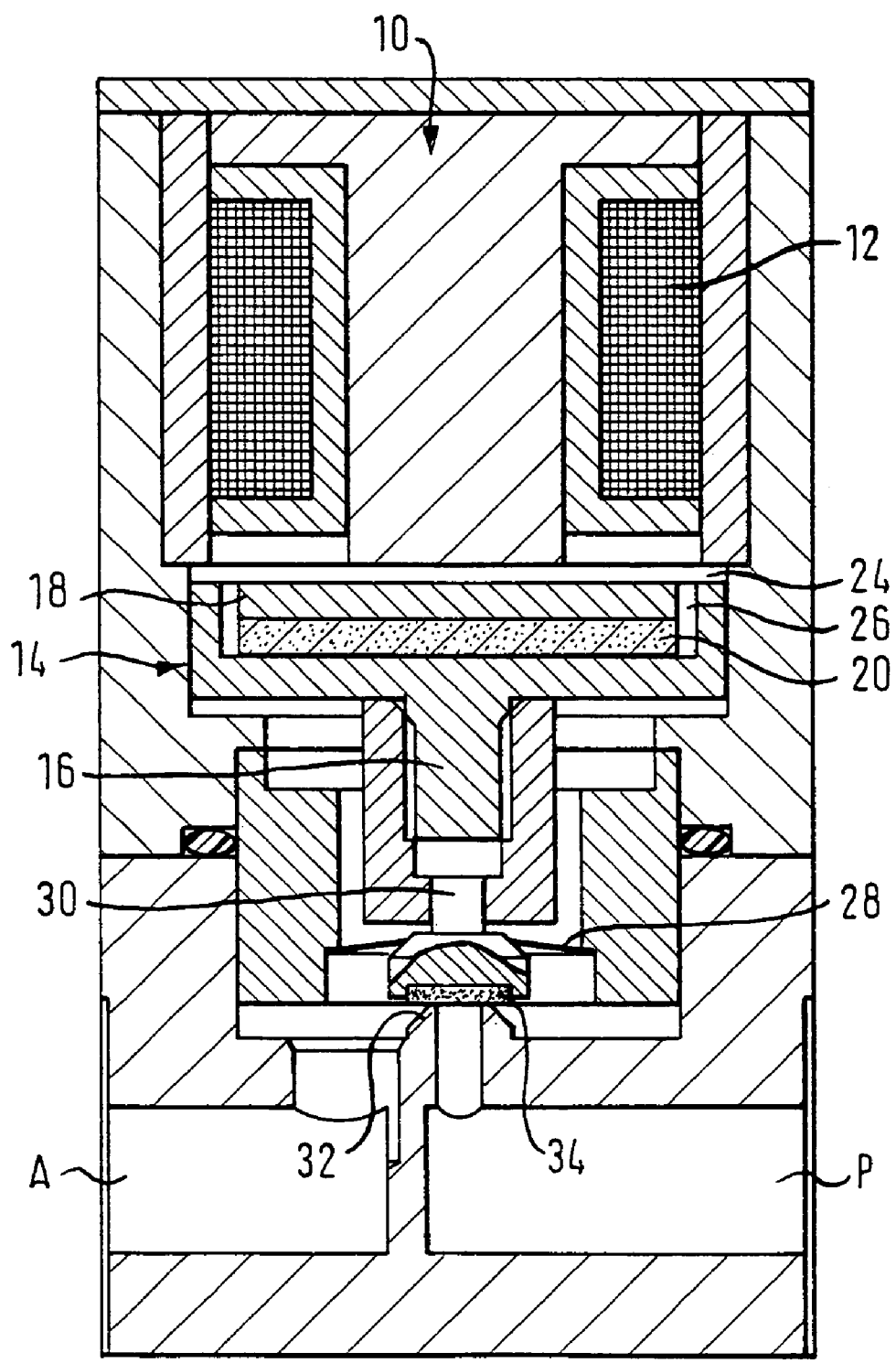
FIG. 6 shows a valve with a magnetic drive according to the invention, in sectional view.

FIG. 6 shows an application of the magnetic drive according to the invention in a fluid valve. A valve body 30, which is pre-stressed by means of a spring element 28 (here: a form spring), closes a valve seat 32, formed between a pressure connection P and a working connection A, with a seal 34. The valve body 30 is coupled to the armature 14 of the magnetic drive, which raises the armature 14 when the solenoid is applied with positive current, so that the valve seat 32 is freed.

The restoring takes place either solely through the force of the spring element 28 or assisted by the solenoid being applied with a negative current.

The invention claimed is:

1. A magnetic drive for a valve, in particular for a pneumatic or hydraulic valve, comprising a fixed solenoid, a movable armature and a permanent magnet, said permanent magnet being integrated into said movable armature and cooperating with said fixed solenoid, said permanent magnet being formed from one of a magnetic paste and a magnetic foil, said armature comprising at least a first part and a second part and being movable in an axial direction, said permanent magnet being arranged between the first part and the second part with respect to the axial direction, said first and second parts of said armature being constructed in a plate shape, the second part lying directly opposite the solenoid, the first part having an extension extending in the axial direction towards the solenoid, and a radial gap formed between the extension of the first part and the second part with respect to the axial direction, said armature being movable between a first position in which a working air gap is provided both between the axial extension of said first part and the solenoid and also between said second part and said solenoid, and a second position in which both said extension of said first part and said second part are in contact with said solenoid.

2. The magnetic drive according to claim 1, wherein the paste or foil permanent magnet is produced on the basis of a NdFeB powder.

3. A valve with a magnetic drive according to claim 1, wherein the armature is pre-stressed by a spring element in a direction pointing away from the solenoid.

4. The magnetic drive according to claim 1, including a magnetically non-conducting material arranged in said radial gap.

* * * * *